(12) United States Patent
Chen et al.

(10) Patent No.: US 6,961,181 B2
(45) Date of Patent: **\*Nov. 1, 2005**

(54) COMPENSATED COLOR MANAGEMENT SYSTEMS AND METHODS

(75) Inventors: Jianmin Chen, Superior, CO (US); Michael G. Robinson, Boulder, CO (US); Jonathan R. Birge, Cambridge, MA (US); Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/839,479

(22) Filed: May 5, 2004

(65) Prior Publication Data

US 2004/0207919 A1 Oct. 21, 2004

Related U.S. Application Data

(62) Division of application No. 10/000,227, filed on Nov. 30, 2001, now Pat. No. 6,816,309.

(51) Int. Cl.⁷ .......................... G02B 27/28; G03B 21/14
(52) U.S. Cl. .................. 359/498; 359/497; 359/499; 353/20; 353/31; 353/34
(58) Field of Search .............................. 359/497, 498, 359/499, 483, 485, 487; 353/20, 31, 34; 349/9

(56) References Cited

U.S. PATENT DOCUMENTS

| | | | |
|---|---|---|---|
| 4,461,542 A | 7/1984 | Gagnon | |
| 4,548,479 A * | 10/1985 | Yeh | ............ 359/498 |
| 5,534,949 A | 7/1996 | Baron | |
| 5,751,384 A * | 5/1998 | Sharp | ............ 349/18 |
| 5,892,612 A | 4/1999 | Miller et al. | |
| 6,042,234 A | 3/2000 | Itoh | |
| 6,183,091 B1 | 2/2001 | Johnson et al. | |
| 6,384,972 B1 | 5/2002 | Chuang | |
| 6,419,362 B1 | 7/2002 | Ikeda et al. | |
| 6,636,276 B1 * | 10/2003 | Rosenbluth | ............ 349/8 |
| 6,652,103 B2 | 11/2003 | Chiang | ............ 353/31 |
| 6,698,896 B2 | 3/2004 | Suzuki | ............ 353/33 |
| 2002/0001135 A1 * | 1/2002 | Berman et al. | ............ 359/640 |
| 2002/0105619 A1 | 8/2002 | Lin | |
| 2004/0189948 A1 | 9/2004 | Okuyama | ............ 353/20 |

OTHER PUBLICATIONS

G.D. Sharp, et al., "Retarder Stack Technology for Color Manipulation", Proc. of 1999 SID International Symposium, San Jose, CA, May 18–20, 1999.*
International Search Report from copending PCT/US03/36803 application mailed Apr. 27, 2004.

* cited by examiner

Primary Examiner—John Juba, Jr.
(74) Attorney, Agent, or Firm—Baker & McKenzie LLP

(57) ABSTRACT

Beamsplitters are frequently used in projectors based on reflective liquid crystal display for separating input and output light, and more recently for color management systems. Rather stack filters are used in such systems to orthogonally polarize primary colors, converting polarizing beamsplitters to color splitters and combiners. Geometric polarization rotations induced by beamsplitters at moderate f-numbers have the effect of significantly degrading performance. Because retarder stacks in general rely on a specific input polarization to perform properly, such skew rays are responsible for color cross-talk. Retarder stacks designed according to the present invention are sensitive to the symmetries that exist between input and output polarizer configurations. These stacks provide the polarization transformations that will compensate for skew rays, such that normal incidence performance is maintained for all incident light.

23 Claims, 11 Drawing Sheets

FIG. 4A

TABLE 1

| | NON-ROTATED BAND | ROTATED BAND |
|---|---|---|
| CASE 1 - PARALLEL REFLECTING PLANES | $\begin{pmatrix} 1 & 0 \\ 0 & 1 \end{pmatrix}$ IDENTITY. DOES NOTHING SINCE THERE IS NO NEED TO ALTER POLARIZATION STATE OF ANY RAYS. THERE IS NO MIXING OF POLARIZATION STATES SINCE PBS AXES ARE PARALLEL FOR ALL RAYS | $\begin{pmatrix} 0 & 1 \\ -1 & 0 \end{pmatrix}$ PURE 90° ROTATION. ANY INPUT POLARIZATION AXES WILL BE ROTATED BY $\pi/2$ REGARDLESS OF INPUT POLARIZATION |
| CASE 2 - PERPENDICULAR REFLECTING PLANES | $\begin{pmatrix} 1 & 0 \\ 0 & -1 \end{pmatrix}$ REFLECTION ABOUT AXES DEFINED BY NORMALLY INCIDENT RAY POLARIZATION | $\begin{pmatrix} 0 & 1 \\ 1 & 0 \end{pmatrix}$ REFLECTION ABOUT AXIS BISECTING ORTHOGONAL AXES, ONE OF WHICH IS DEFINED BY NORMALLY INCIDENT RAY POLARIZATION |

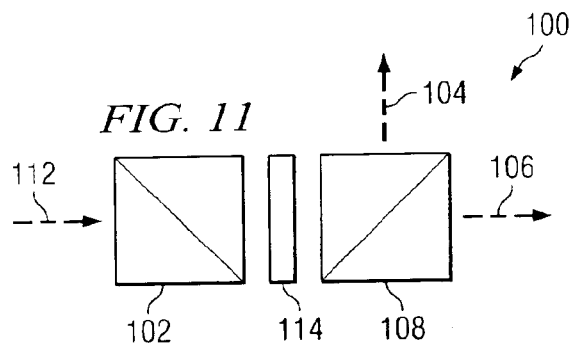
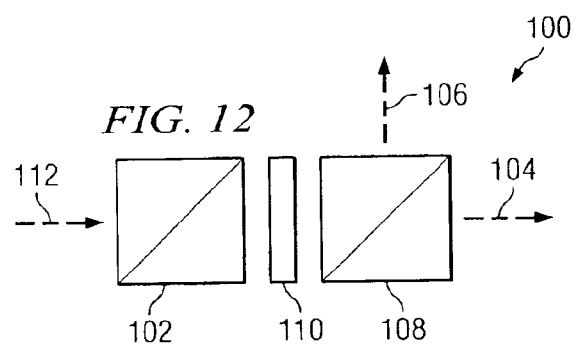
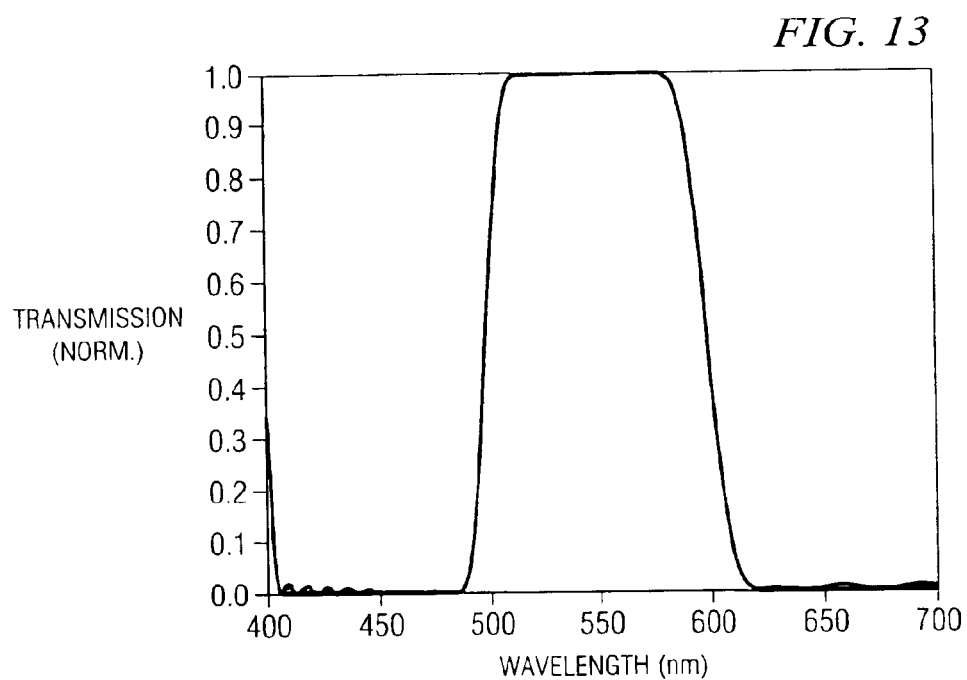

COMPENSATED COLOR MANAGEMENT SYSTEMS AND METHODS

CROSS-REFERENCE TO RELATED APPLICATIONS

This application is a divisional of U.S. application Ser. No. 10/000,227, filed Nov. 30, 2001 entitled "Compensated Color Management Systems and Methods," and now U.S. Pat. No. 6,816,309, the entire contents of which is hereby incorporated by reference.

This application is also related to U.S. application Ser. No. 10/294,426, filed Nov. 14, 2002 entitled "Compensated Color Management Systems and Methods," U.S. application Ser. No. 10/713,548 filed Nov. 14, 2003 entitled "Three Panel Color Management Systems and Methods," PCT Application No. PCT/US02/37753 filed Nov. 26, 2002 entitled "Compensated Color Management Systems and Methods" and PCT Application No. PCT/US03/36803 filed Nov. 14, 2003 entitled "Three Panel Color Management Systems and Methods."

FIELD OF THE INVENTION

The present invention relates generally to color management in projection displays and similar systems, and more particularly to skew-ray correction in the color management of video projection systems.

BACKGROUND

It is generally desirable for projection systems to produce high quality images while being compact and inexpensive. In prior art transmissive systems using polysilicon liquid crystal panels, high contrast is achieved by situating each panel between crossed sheet polarizers. Color management beamsplitters/combiners and other optics are external to these units, insuring that polarization is not contaminated and contrast degraded.

In projection systems using reflective panels, such as liquid crystal on silicon (LCOS) displays, beam routing is frequently accomplished using polarizing beamsplitters (PBSs). PBSs are four-port devices, comprising an input port, an output port, and a reflective panel port, with the fourth port typically unused. The behavior of thin-film PBS cubes, for instance, is such that s-polarized light is reflected, while orthogonally polarized light is substantially transmitted.

Efficient use of ultra-high pressure mercury (UHP) lamp emission to achieve high-brightness generally requires that the projection system operate at f2.8 or lower. F-number reduction to achieve high brightness is often accompanied by diminished contrast ratio. In practice, precise separation of input and modulated light becomes challenging when PBSs are used in even modest f-number systems. The control of skew rays in such systems has previously been analyzed in the context of contrast ratio preservation. A simple quarter-wave retarder between the panel and PBS is a well-known compensation scheme for managing contrast loss due to the PBS geometrical rotation.

Compact LCOS-based projection systems can be realized by combining the beam separation function of the PBS with a polarization based color management. Retarder stacks, as described in U.S. Pat. No. 5,751,384, enable encoding of color by polarization, thereby expanding the role of neutral PBSs to function as color splitters and combiners. However, such color management systems have the same skew-ray susceptibility found in the panel ports. In order to maintain high color quality and contrast in low f-number systems, the polarization encoding incorporates skew ray correction.

SUMMARY OF THE INVENTION

An aspect of the invention is to provide an optical filter including at least three retarders where the at least three retarders cause optical rotation to light of a first spectrum substantially without introducing retardation.

An aspect of the invention is to provide an optical filter including at least three retarders wherein the at least three retarders act as a half wave plate to light of a first spectrum and wherein the at least three retarders act as a half wave plate with a $\pi/4$ displaced optical axis to light of a second spectrum.

An aspect of the invention is to provide an optical filtering method, the steps of the method including optically rotating light of a first spectrum without introducing retardation.

An aspect of the invention is to provide an optical filter method, the steps of the method including retarding light of a first spectrum and retarding light of a second spectrum. A half wave of retardation is provided by the retarding light of a first spectrum and a retardation equivalent to a half wave plate with a $\pi/4$ displaced optical axis is provided by the retarding light of a second spectrum.

An aspect of the invention is to provide an optical arrangement including a half waveplate and a pair of beam splitters oriented orthogonally to each other. The pair of beam splitters sandwiching the half waveplate.

An aspect of the invention is to provide a method of filtering light, steps of the method including splitting a first light beam to form a second light beam, retarding the second light beam with a half wave of retardation to form a third light beam, and splitting the third light beam.

An aspect of the invention is to provide an optical arrangement including a planar polarizer, a beam splitter, and an out-of-plane retarder between the planar polarizer and the beam splitter.

An aspect of the invention is to provide a method of filtering light, the steps of the method including polarizing an incident light beam to form a polarized light beam, retarding the polarized light beam with an out-of-plane retarder to form a retarded light beam and splitting the retarded light beam.

An aspect of the invention is to provide a compensating color selective polarization filter (CCSPF) which, substantially independent of input polarization angle, has no effect on the state of polarization (SOP) of one portion of the spectrum, while another portion of the spectrum is converted to the orthogonal SOP.

Another aspect of the invention is to provide a CCSPF which reflects the SOP of one portion of the spectrum about an axis, while another portion of the spectrum is reflected about an axis displaced by $\pm\pi/4$ with respect to the aforementioned axis.

Another aspect of the invention is to provide a CCSPF which includes an out-of-plane uniaxial compensator.

Another aspect of the invention is to provide a skew ray compensated structure, including a first beam splitter, a second beam splitter, and a CCSPF. The CCSPF is between the first and second beam splitters, such that the SOP of skew rays transmitted by the first beam splitter are preconditioned so as to compensate for the skew-ray polarizing properties of the second beam splitter.

Another aspect of the invention is to provide a projection system including at least one structure comprising of a pair of beamsplitters bounding a CCSPF.

Another aspect of the invention is to provide a projection system including a pre-polarizer adjacent to a first CSPF that converts one spectrum of light to the orthogonal SOP, and does not change the SOP of another spectrum of light, a first PBS adjacent to the first CSPF for separating the one spectrum of light from the another spectrum of light, a second PBS adjacent to the first PBS, and a first display panel for selectively reflecting light adjacent to the second PBS, a first CCSPF between the first PBS and a third PBS that reflects the SOP of a first portion of the another spectrum of light about an axis and reflects the SOP of a second part of the another spectrum of light about another axis, a second panel for selectively reflecting light adjacent to a face of the third PBS opposing the first CCSPF, a third panel for selectively reflecting light adjacent to another face of the third PBS, a second CCSPF adjacent to a face opposing the third panel, the second CCSPF reflecting the SOP of the first portion of the another spectrum of light about an axis and reflecting the SOP of the second part of the another spectrum of light about another axis, a first half wave plate between the second PBS and the fourth PBS, a second CSPF that converts the SOP of one spectrum of light to the orthogonal state and does not effect the another spectrum of light adjacent to the fourth polarizing beam splitter, and a polarizer adjacent to the second CSPF.

BRIEF DESCRIPTION OF THE DRAWINGS

FIG. 11 shows a skew-ray corrected structure, including a half-wave retarder CCSPF with wavelength selective optic axis orientation between PBSs with crossed faces;

FIG. 12 shows a skew-ray corrected structure, including a purely rotative CCSPF between PBSs with parallel faces;

FIG. 13 shows the spectrum of a Green/Magenta rotationally tolerant filter between paired polarization beam splitters uniformly averaged over half cone angles of 0°, 5°, 10°, 15° and 20° according to another exemplary embodiment of the present invention;

DETAILED DESCRIPTION

Figure 1:
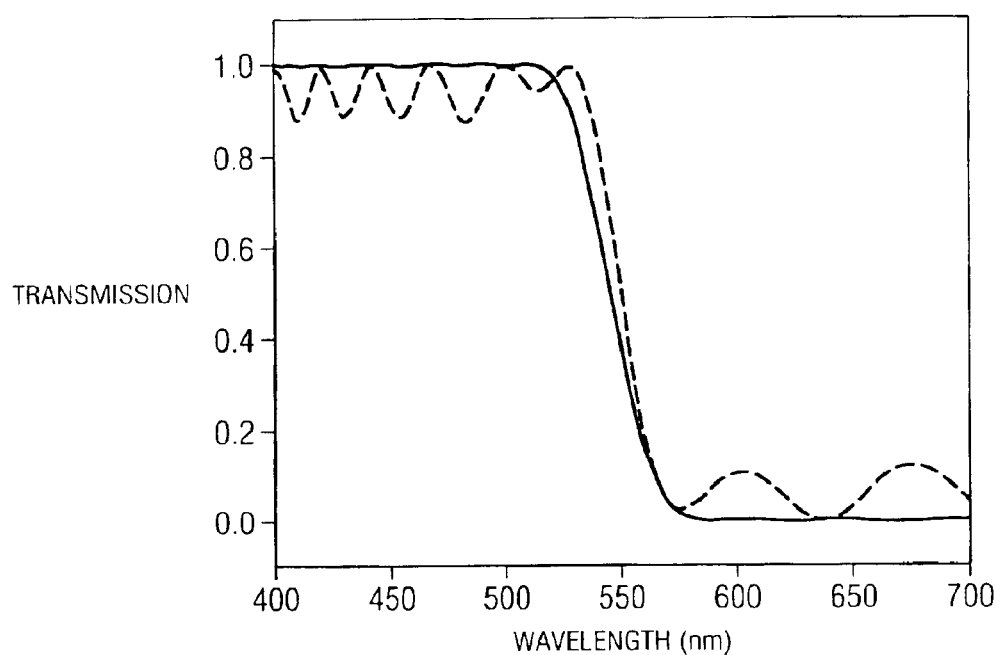
FIG. 1 shows a prior art rotation intolerant Red/Blue filter spectrum viewed through parallel polarizers at normal incidence where the solid trace shows input/output light along the design axis and the dashed trace shows input/output light at 10° to the design axis.
Figure 2:
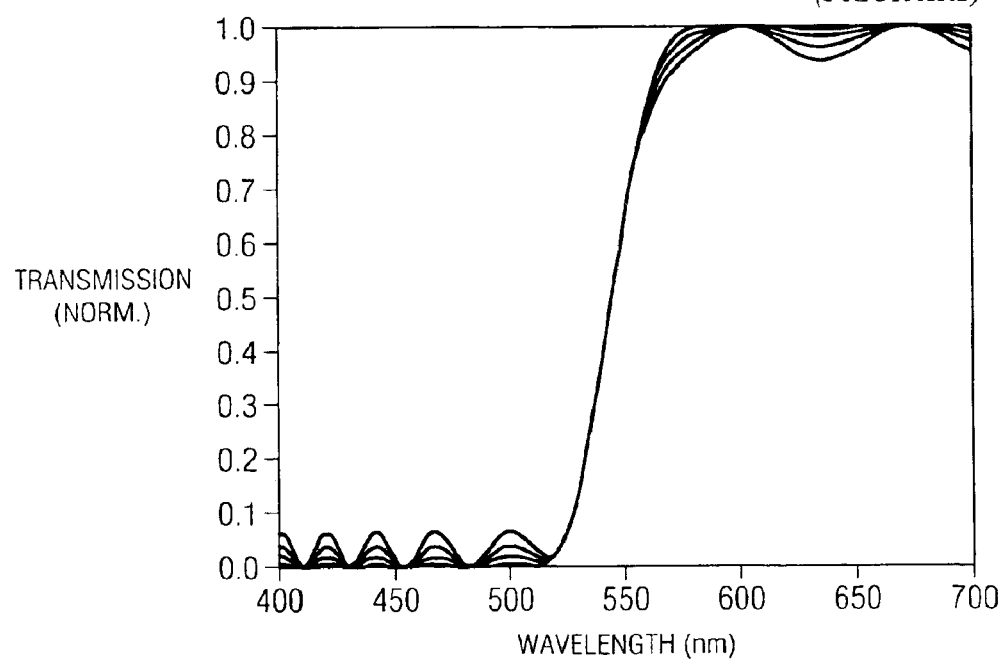
FIG. 2 shows the spectrum of a prior art rotation intolerant Red/Blue filter between paired polarization beam splitters where azimuth averaged output spectra are plotted for half-cone angles of 0°, 5°, 10°, 15° and 20°, with the latter giving the highest side-lobe leakage.
Figure 3:
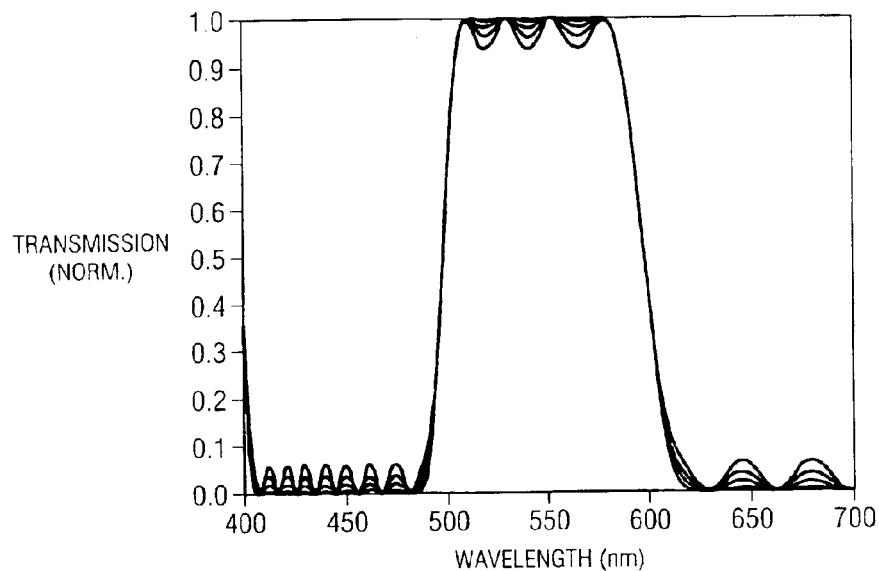
FIG. 3 shows the azimuth averaged output spectrum of a prior art Green/Magenta rotation intolerant filter between paired polarization beam splitters plotted for illumination half-cone angles of 0°, 5°, 10°, 15° and 20°, with the latter giving the highest side-lobe leakage.

FIG. 1 shows the spectrum of a prior art rotation intolerant Red/Blue CSPF viewed through parallel polarizers at normal incidence. The solid trace shows the spectrum with the input/output SOP along the design axis and the dashed trace shows the spectrum with the input/output SOP at 10° to the design axis. FIG. 2 shows the spectrum of a prior art rotation intolerant Red/Blue filter between paired polarization beam splitters. The output represents the average of spectra corresponding to rays distributed in azimuth with half-cone angles of 0°, 5°, 10°, 15° and 20°, with the latter giving the highest side-lobe leakage. FIG. 3 shows the spectrum of a prior art Green/Magenta rotation intolerant filter between paired polarization beam splitters. The output represents the average of spectra corresponding to rays distributed in azimuth with half-cone angles of 0°, 5°, 10°, 15° and 20°, with the latter giving the highest side-lobe leakage.

FIGS. 1, 2 and 3 each demonstrate that color cross-talk occurs in prior art CSPFs as a consequence of skew ray depolarization. The cross-talk is manifested as side-lobes that reduce brightness and/or contrast. The side-lobes are independent of leakage along the design axis and are the consequence of compound retardation that can be a significant fraction of the total retardation of the stack. As such, light rays introduced parallel or perpendicular to the design axis can have low stop-band light leakage, while light rays that are rotated such that they are not parallel or perpendicular to the design axis often have substantial side-lobes that reduce the overall performance. Thus, color management systems using prior art CSPFs can have unacceptable contrast and/or brightness due to the presence of rotated polarization.

Figure 4:
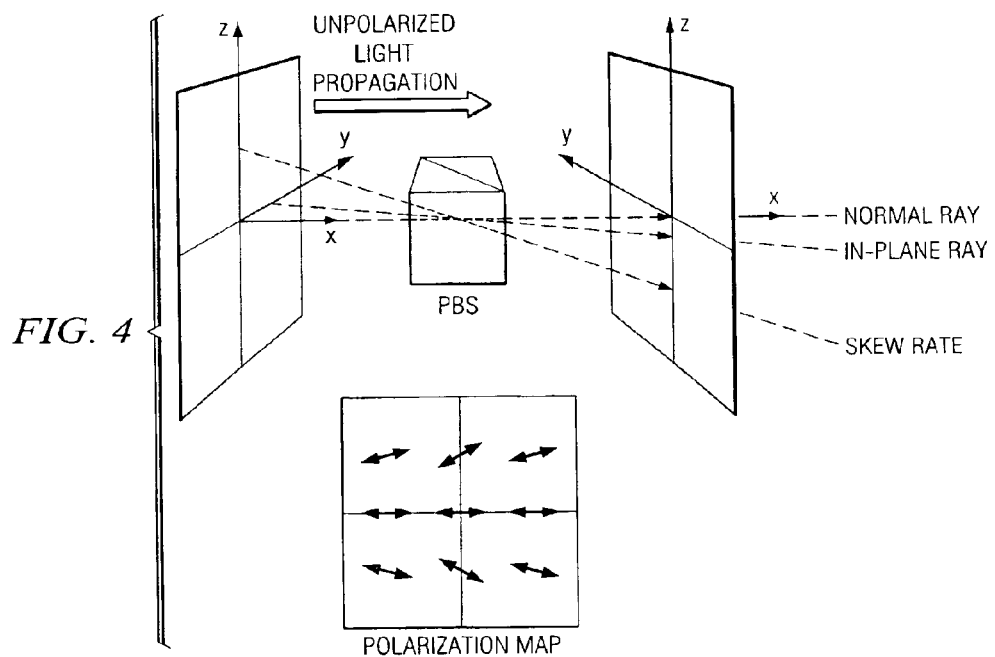
FIG. 4 is an illustration showing that skew rays have their polarization rotated, while normal and in-plane rays do not have their polarizations rotated.

As FIG. 4 shows, skew rays travelling through a beam splitter have rotated polarization (relative to the axis defined by normally incident light), while in-plane rays have non-rotated polarization. In particular, light incident on the 45° reflecting dichroic coated surface of a PBS is polarized or analyzed along axes defined by the incident ray angle and the reflecting plane normal. For skew rays, this polarization direction is rotated relative to the axis defined by normally incident light.

The performance of color management systems may be improved by matching the CSPF design to the characteristics of polarizer/beamsplitter configurations, representing the more constrained subset of compensated CSPFs, or CCSPFs. The CCSPFs of the present invention provide the desired color selective properties, and also exploit input/output symmetry to compensate for skew ray depolarization. This results in improved performance, particularly at low system f-number.

An exemplary first method to correct for the above depolarization is to introduce CCSPFs based on stacked retardation films or plates. When compensating for the skew ray effects introduced by pairs of beamsplitters, a compensation scheme based on retarders with in-plane optic axes (or a-plates) is preferred. The polarization properties of such stacks are essentially independent of the incident angle of the light, particularly for biaxial films with Nz=0.5 (Nz= (nx−nz)/(nx−ny) where nx is the refractive index in the x direction, ny is the refractive index in the y direction and nz is the refractive index in the z direction), and as such the polarization property of any one stack can be described mathematically by a Jones' Matrix which is independent of incident angle. A second method compensates for the geometric effects of a PBS used in combination with plane polarizers using one or more out-of-plane uniaxial birefringent layers (or o-plates).

Mathematically, the polarization axes (s and p) depend on the incident ray vector k (within the PBS) and the vector n, normal to the reflecting surface by the following expressions:

$$s = \frac{n \times k}{|n \times k|}; p = \frac{s \times k}{|s \times k|}$$

Defining a coordinate system as shown in FIG. 4 where the normally incident rays propagate along the x-axis, and the normal to the reflecting plane is in the x,y plane, the s polarization axes for each of the normally incident, in-plane and skew rays respectively are:

$$\begin{pmatrix} 0 \\ 0 \\ 1 \end{pmatrix}, \begin{pmatrix} 0 \\ 0 \\ 1 \end{pmatrix} \text{ and } \begin{pmatrix} 0 \\ \sin(\theta) \\ \cos(\theta) \end{pmatrix}.$$

The normally incident and in-plane rays are unchanged from what is conventionally defined as the s-polarization axis of a PBS, i.e., the normally incident s (NIS) axis. For skew rays, the s-polarization axis is rotated by an angle equal to the ray angle θ from the optical transmission axis in the PBS. The sign of the rotation depends on the sign of the incident angle and the normal of the reflecting surface. As a result, sequential PBSs with orthogonal reflecting surfaces have polarization axes for skew rays that are not parallel. This can be corrected using a CCSPF with polarization reflection properties.

For sequential PBSs with parallel reflecting surfaces, skew rays see parallel polarization axes but are rotated from the axes seen by normally incident rays. For color projection systems that are optimized for orthogonal polarization axes aligned with the NIS axis, this results in a loss of system optical performance that can be corrected using a CCSPF with pure rotation properties.

Table 1 (which is illustrated in FIG. 4a) describes the desired polarization performance of the various CCSPF filters using Jones' matrix notation. Case 1 has isotropic behavior in the non-rotated portion of the spectrum over the range of angles introduced. In the rotated portion of the spectrum, a pure π/2 rotator is used over the range of angles introduced. When the hypotenuse faces are orthogonal, the non-rotated band of Case 2 has a polarization reflection, as accomplished by a neutral half-wave plate with its optic axis aligned along or orthogonal to the NIS axis. The desired behavior in the rotated portion of Case 2 is accomplished using a structure that provides a pure half-wave retardation with its optic axis at ±π/4 to the NIS axis in the plane normal to the optical transmission axis.

Proper selection of a retarder stack design to achieve Case 1 or Case 2 behavior requires understanding the general behavior of such structures. In color management systems, it is generally desirable that the spectrum be precisely partitioned according to the red, green and blue portions of the light source emission. This can include stable polarizing properties over a significant range of wavelengths, such that one spectral portion transmitted by the CCSPF has a substantially constant SOP, while a second portion emerges with the orthogonal SOP. The aforementioned wavelength stability can be achieved by using multi-layer structures, often with as many as twenty layers, to achieve acceptable performance in projection systems.

As the number of layers is increased to address the spectral criteria, the total retardance of the stack can rise to well over 10,000 nm. The composite structure can be considered the combination of a compound retardation and rotation at each wavelength, as described by a Jones' matrix. While the network synthesis technique identifies numerous stack designs that provide the same power spectrum, each has a unique Jones' matrix. (The network synthesis technique (see Harris et al. (1964), J. Opt. Soc. Am. 54:1267, Ammann et al. (1966), J. Opt. Soc. Am. 56:1746, and Ammann (1966), J. Opt. Soc. Am. 56:943) is a procedure for determining the orientations of the N retarders, and the exit polarizer, to obtain the desired amplitudes of the (N+1) impulses.) A common characteristic is that a stack has a significant compound retardation with a fairly stable eigenpolarization along the direction of the design axis. This retardation is often characterized by fairly linear phase within the flat regions of the spectrum. Typically, the retardation in the converted band differs from that in the non-converted band. Nonlinear phase often exists in the transition band of the spectrum.

Stack designs may be sorted to identify those that are most manufacturable. Optimum use of material occurs when the angles are small relative to the web direction since the films are often cut from roll stock. These stacks exhibit high overall compound retardation, and therefore the greatest sensitivity to rotated input/output polarization. The tight clustering of angles produces accumulation of retardation, such that the compound retardance is often a significant fraction of the total stack retardation. Conversely, stacks with the lowest compound retardation have a broad distribution of stack angles.

Case 1 represents a CCSPF that behaves isotropically in the non-converted band, and as a pure rotator in the converted band. The stack essentially vanishes in a range of wavelengths about the full-wave retardation in the non-converted band. As such, the compound retardation is near zero within this band. Pure rotation signifies that the stack also exhibits zero retardation within the converted portion of the spectrum. Such a structure has circular eigenpolarizations, in general transforming an input linear state to an output linear state with the prescribed rotation angle.

Consider a rotator formed from a pair of half-wave plates at arbitrary angles $\alpha$ and $\beta$. At the design wavelength, the Jones' matrix for the structure shows that the combination of two polarization reflections yields a pure rotation $$\begin{pmatrix} \cos 2\beta & \sin 2\beta \\ \sin 2\beta & -\cos 2\beta \end{pmatrix} \begin{pmatrix} \cos 2\alpha & \sin 2\alpha \\ \sin 2\alpha & -\cos 2\alpha \end{pmatrix} = \begin{pmatrix} \cos[2(\alpha-\beta)] & \sin[2(\alpha-\beta)] \\ -\sin[2(\alpha-\beta)] & \cos[2(\alpha-\beta)] \end{pmatrix}.$$

When the angle between the half-wave plates is $\pi/4$, the matrix yields the desired pure rotator or $$\begin{pmatrix} 0 & 1 \\ -1 & 0 \end{pmatrix}.$$

Such behavior is not maintained, however, with small excursions from the half-wave retardation. Moreover, the insensitivity to absolute orientation of the structure experienced at the half-wave retardation, is not preserved at other wavelengths. As the number of layers is increased to achieve improved spectral performance, this sensitivity is typically enhanced.

If one considers only behavior at the half-wave wavelength, it can be shown using Jones' calculus that an odd number of films represents a reflection about an axis, while an even number of films produces a rotation. While this behavior may be confined to a very narrow portion of the converted band, it nonetheless gives some guidance in selecting number of films.

In general, the network synthesis method does not identify structures that provide zero compound retardation. Evaluating the Jones' matrix of each design can identify structures with the lowest compound retardation. Further reduction in compound retardation can be accomplished by placing a bias retarder parallel/perpendicular to the design axis according to the present invention. The bias retarder is crossed with the compound retarder of the stack, with retardation selected to minimize the net retardance. This is done with no impact on the spectrum along the design axis. The bias retarder can either proceed or follow the stack, with unique results in each case. Moreover, a different bias retardance on either side of the stack may be used to optimize results. If the bias retarder(s) can be well matched to the stack, then the structure satisfies that Case 1 criterion.

To satisfy Case 2 criteria, a structure that behaves like a pure half-wave retarder is desired, with a wavelength selective optic axis orientation. The optic axis is at 0 or $\pi/2$ throughout the non-converted portion of the spectrum, and has a $\pm\pi/4$ orientation throughout the converted portion. The design of such a stack can be accomplished using the NST using a low retardation building block, or relatively high sampling frequency. This helps to insure the spectral coverage of the retardation requirement. Moreover, this methodology has the potential to build an achromatic half-wave retardance into the design without additional films. To avoid a large number of laminations with high sampling frequency, designs that can be reduced via film pairs can be identified.

Such structures can alternatively be designed in a modular form, including the aforementioned isotropic/optically active structure in combination with a neutral half-wave retarder at 0 or $\pi/2$. In this case, the difference between the bias retarder and the compound retardance is a half-wave. Mathematically, the output in the non-converted band is $$\begin{pmatrix} -1 & 0 \\ 0 & 1 \end{pmatrix} \begin{pmatrix} 1 & 0 \\ 0 & 1 \end{pmatrix} = \begin{pmatrix} -1 & 0 \\ 0 & 1 \end{pmatrix},$$

corresponding to the matrix for a half-wave retarder at 0. The output for the converted band neglecting absolute phase factors is, $$\begin{pmatrix} -1 & 0 \\ 0 & 1 \end{pmatrix} \begin{pmatrix} 0 & 1 \\ -1 & 0 \end{pmatrix} = \begin{pmatrix} 0 & 1 \\ 1 & 0 \end{pmatrix},$$

corresponding to the matrix for a half-wave retarder at $\pi/4$.

The modular approach separates the color selective rotation and polarization reflection criteria, making the latter a neutral operation. However, zero-order half-wave retarders may not be sufficiently neutral to span the entire spectral range. The half-wave center wavelength can be selected to optimize system level performance in this situation. Materials with low birefringence dispersion, or combinations of materials with different dispersions, can also be used to minimize this effect. Beyond this, compound structures, such as Pancharatnam half-wave plates, can be used that broaden the range of the half-wave retardance. In order to enjoy the benefits of broader half-wave bandwidth in practice, care must be taken to insure that the wavelength stability of the optic axis is preserved.

Another modular design splits the color selective portion of the stack, such that a half-wave retarder resides between matched color selective stacks. Consider an input stack that provides a pure $\pi/4$ rotation, an output stack that provides a pure $-\pi/4$ rotation, and a central 0-oriented neutral half-wave retarder. In the non-converted portion of the spectrum, the input/output stacks have substantially no effect on the state of polarization, yielding a 0-oriented half-wave retarder. In the converted portion of the spectrum the output is given by, $$\frac{1}{\sqrt{2}}\begin{pmatrix} 1 & -1 \\ 1 & 1 \end{pmatrix}\begin{pmatrix} -1 & 0 \\ 0 & 1 \end{pmatrix}\frac{1}{\sqrt{2}}\begin{pmatrix} 1 & 1 \\ -1 & 1 \end{pmatrix} = \begin{pmatrix} 0 & 1 \\ 1 & 0 \end{pmatrix},$$

corresponding to a half-wave retarder at $\pi/4$, as set forth in Case 2.

Consider the example of a CCSPF that acts as pure 90° rotator in one portion of the spectrum, and is isotropic in another portion of the spectrum. The structures generated using the NST are evaluated by observing their modeled spectra as they are effectively rotated between crossed polarizers. The figure of merit used is the side-lobe level at the worst-case orientation of 45-degrees, though the slope of the transition band may also be taken into consideration.

The example used is the 50:50 duty ratio case, which has the desired property that double-retardance films can be used to decrease the number of laminations. All but one of the films has a double-retardance in the 50:50 case. As such, the structures have the performance of an N-layer design, but reduce the number of films by a factor of (N−1)/2N. Provided that the retardance tolerance and Nz factor can be substantially maintained at the double-retardance value, and that a retardance value can be selected to achieve spectral requirements, the 50:50 case can be attractive. Alternatively, non-50:50 duty ratio cases can be considered.

For a particular value of N, all designs with (N−1)/2 double retardance values are extracted and evaluated according to their retardance along the design axis. This retardance generates oscillations in transmission with the stack oriented at $\pi/4$. Generally, stacks with a clustering of angles (typically near zero) have the highest composite retardance. The inclusion of additional films may provide zero net retardation. However, this can become impractical where the number of total number of films becomes large.

Conversely, designs with a wide distribution in angles can have very low composite retardance, which can be eliminated with the addition of one or two additional films. In the example given, the additional film is a single-retardation film at $\pi/2$. With the addition of this film, the polarization transformation is nearly insensitive to the orientation of the structure. In effect, the 0-orientation and $\pi/4$-orientation spectra are generated by different stack designs that have substantially the same polarization transformations. The performance at intermediate angles typically varies monotonically between the two extreme cases.

Consider the case of a 0.005% ripple 50:50 design, compensated with a single retardation film at $\pi/2$. A new design can be generated by rotating the structure by $\pi/4$, such that the external $\pi/2$-oriented film assumes the role of the $\pi/4$-oriented single film on the opposite side, which vanishes under this rotation. The two designs can be compared on a film-by-film basis by swapping this generated stack end-for-end.

For a particular N, the design with minimal sensitivity to rotation can be tracked as a function of side-lobe level at zero-orientation. In the case of N=15, the side-lobe level at $\pi/4$ fell as the zero-orientation side-lobe level was reduced. Table 2 shows an exemplary design and the changes in individual retarder angles as the side lobe levels are changed.

Note that the external single-retardance films do not change significantly in orientation (because of the 50:50 nature), but that the largest change in side lobe level (from 0.5% to 0.005%) is accomplished with more than 23-degrees of change in orientation of internal double-retardation films. These changes have a relatively large influence on the spectrum when the stack is rotated by $\pi/4$.

Consider the 0.005% design in Table 2. Table 3 shows the layout after rotating the design by $\pi/4$ and swapping the stack end-for-end. While this generates two distinct designs, their behavior has some similarities. The internal double-retardation structure is somewhat insensitive to sign change relative to the single-retardation film. That is, the magnitudes of the orientations of corresponding double-retardation films are similar, but the signs are reversed with respect to the single-retardation film.

Figure 5:
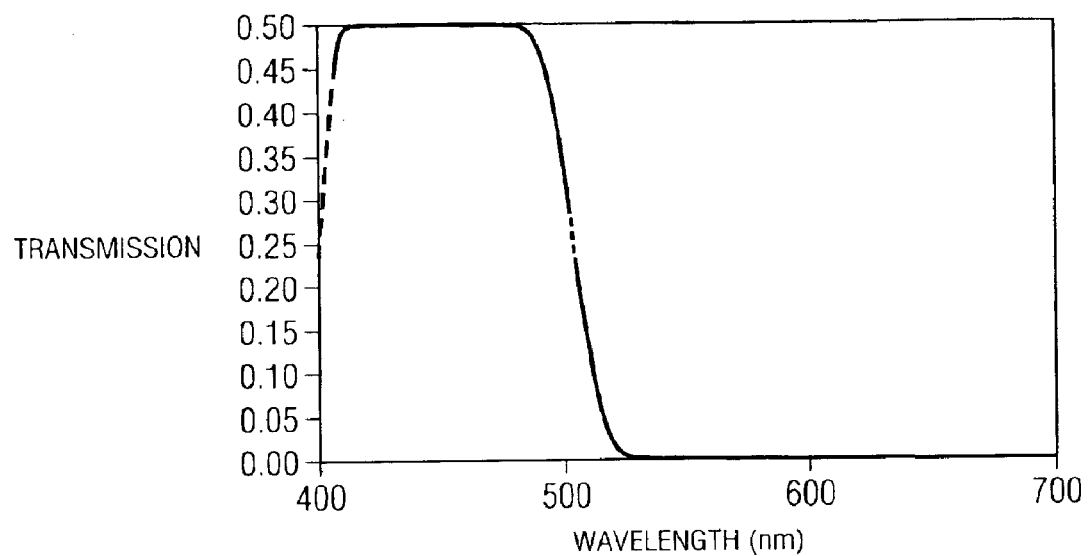
FIG. 5 shows the crossed polarizer spectrum of 50:50 duty ratio stack using 600 nm film (505 nm 50% point) and 0.005% side lobes.
Figure 6:
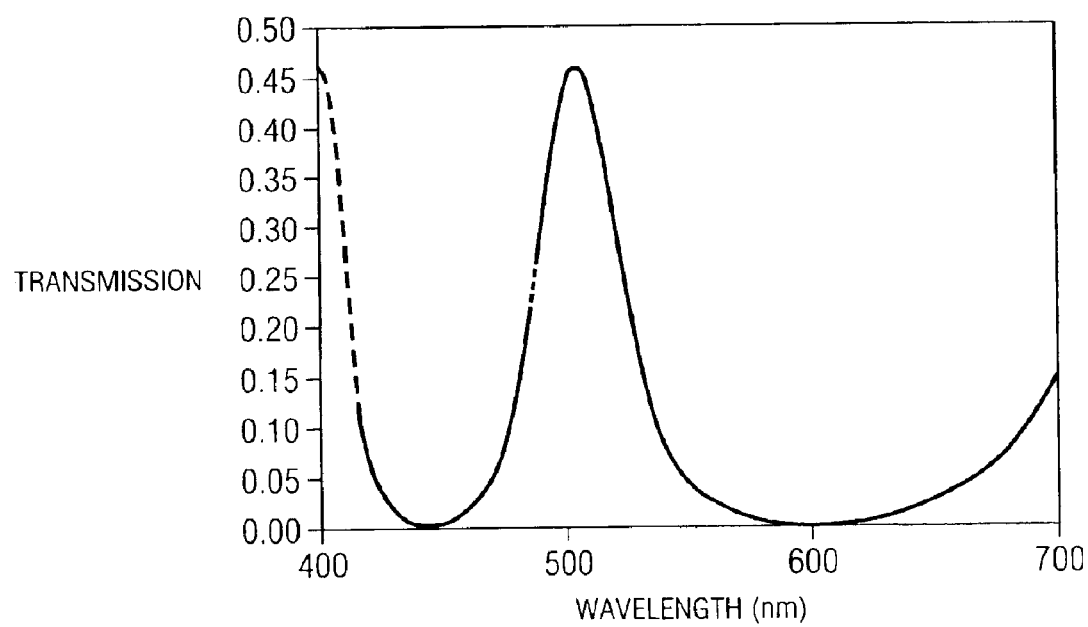
FIG. 6 shows the crossed polarizer spectrum of 50:50 duty ratio stack using 600 nm film (505 nm 50% point) and 0.005% side lobes, rotated by π/4.
Figure 7:
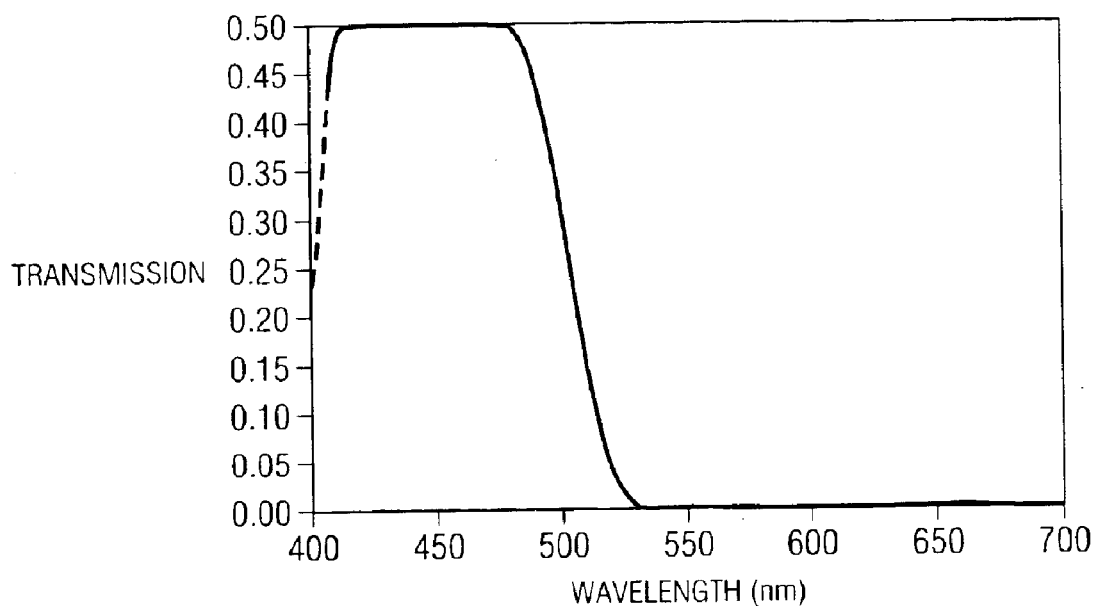
FIG. 7 shows the crossed polarizer spectrum of 50:50 duty ratio stack using 600 nm film (505 nm 50% point) and 0.005% side lobes, rotated by π/4, with additional 600 nm film at π/2.
Figure 8:
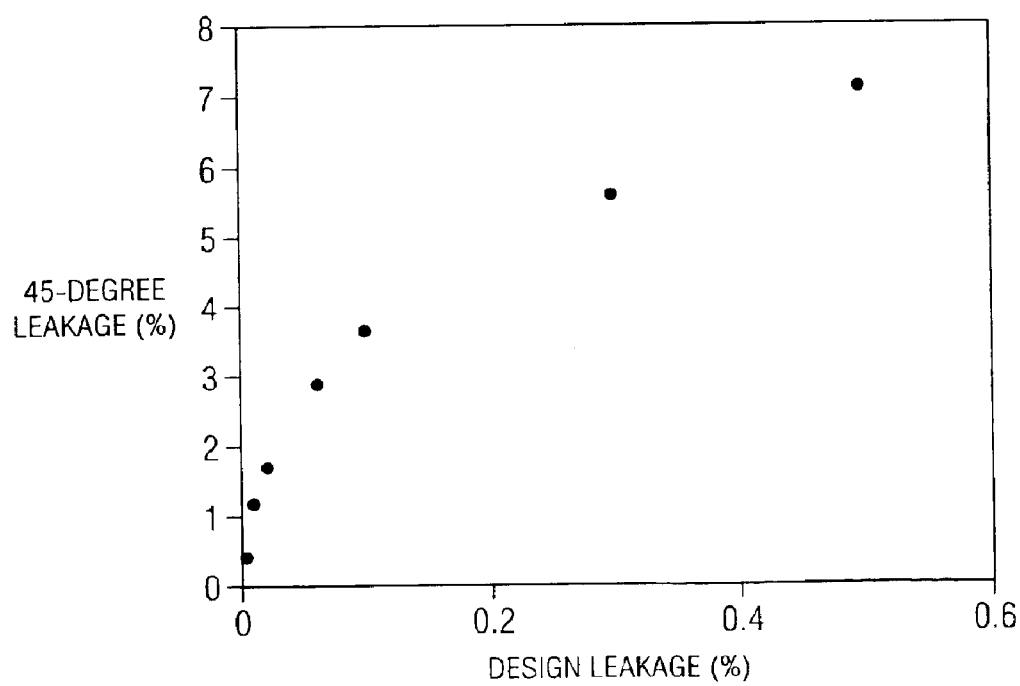
FIG. 8 shows the maximum side-lobe leakage with the stack oriented at π/4 for the designs of Table 2.

FIG. 5 is the crossed-polarizer spectrum for the 50:50 design with 0.005% side lobes shown in Table 2 based on a 600 nm film. This embodiment includes a blue-yellow filter, such as described in U.S. Pat. Nos. 5,751,384, 5,990,996, 5,822,021, 5,953,083, 6,078,374, 6,046,786 and 5,658,490, each of which are incorporated herein by this reference. FIG. 6 is the stack design of FIG. 5 rotated by $\pi/4$ between crossed polarizers, showing that the first-order linear half-wave retardation in the blue nearly eliminates the blue pass-band. FIG. 7 shows the same stack design at $\pi/4$, with the addition of a single 600 nm film. As Table 2 shows, the additional film is at $\pi 2$, which is crossed with the compound retardance. FIG. 7 shows that this film is well matched to the compound redardance, resulting in a blue spectrum that is well matched to FIG. 5. The side lobe level is somewhat worse than the FIG. 5 spectrum (0.38%) and that the transition slope is also relatively shallow. FIG. 8 shows the maximum side-lobe leakage with the stack oriented at $\pi/4$ for the designs of Table 2. The largest leakage occurs for the 0.5% design and lowest leakage occurs for the 0.005% design. The side lobe level is measured along the design axis.

TABLE 2

Eight-Layer (50:50 Duty-Ratio) Rotationally Invariant
Designs With Different Maximum Ripple Amplitudes

| Retardance | 0.5% | 0.3% | 0.1% | 0.02% | 0.005% | Angle difference between 0.5% and 0.005% designs |
|---|---|---|---|---|---|---|
| Γ  | 90.0°  | 90.0°  | 90.0°  | 90.0°  | 90.0°  | 0° |
| 2Γ | −33.7° | −32.9° | −30.9° | −27.3° | −22.9° | 10.8° |
| 2Γ | −50.0° | −49.3° | −47.1° | −41.8° | −33.4° | 16.6° |
| 2Γ | −24.6° | −22.5° | −17.9° | −9.7°  | −1.0°  | 23.6° |
| 2Γ | −69.7° | −69.7° | −69.1° | −66.2° | −61.1° | 8.6° |
| 2Γ | 31.8°  | 30.8°  | 30.0°  | 31.7°  | 36.4°  | 6.4° |
| 2Γ | 61.7°  | 63.3°  | 67.4°  | 75.6°  | 85.6°  | 23.9° |
| 2Γ | 46.9°  | 47.4°  | 49.0°  | 53.5°  | 61.1°  | 14.2° |
| Γ  | 46.0°  | 46.0°  | 46.2°  | 46.5°  | 46.7°  | 0.7° |

TABLE 3

Comparison Of Rotationally Invariant Design With Transformed Design
(Design generated from 45° rotation and reverse in order.)

| Retardance | 0.005% | 0.005% after transformation |
|---|---|---|
| Γ  | 90.0°  | −1.7° |
| 2Γ | −22.9° | 16.1° |
| 2Γ | −33.4° | 40.6° |
| 2Γ | −1.0°  | −8.6° |
| 2Γ | −61.1° | 73.9° |
| 2Γ | 36.4°  | −46.0° |
| 2Γ | 85.6°  | −78.4° |
| 2Γ | 61.1°  | −67.9° |
| Γ  | 46.7°  | 45.0° |

Figure 9:
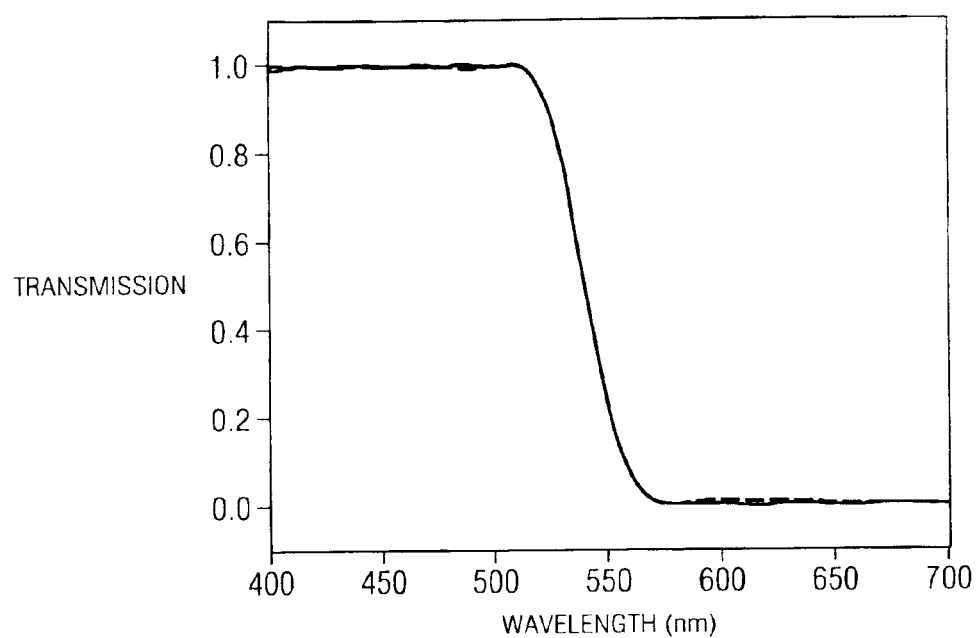
FIG. 9 shows a rotation tolerant Red/Blue filter spectrum viewed through parallel polarizers using an exemplary embodiment of the present invention where the solid trace shows input/output light polarized and analyzed parallel to the design axes and the dashed trace shows input/output light polarized and analyzed at 10° to the design axes.

FIG. 9 shows the spectrum of an exemplary Red/Blue CCSPF designed with rotation invariance according to the Case I criteria. This Red/Blue filter is viewed between parallel sheet polarizers with the design axis of the filter parallel and at 10° to the polarization axis. The performance of this filter is greatly improved as shown by the absence of side lobes under a 10° rotation, in comparison to that of FIG. 1.

Figure 10:
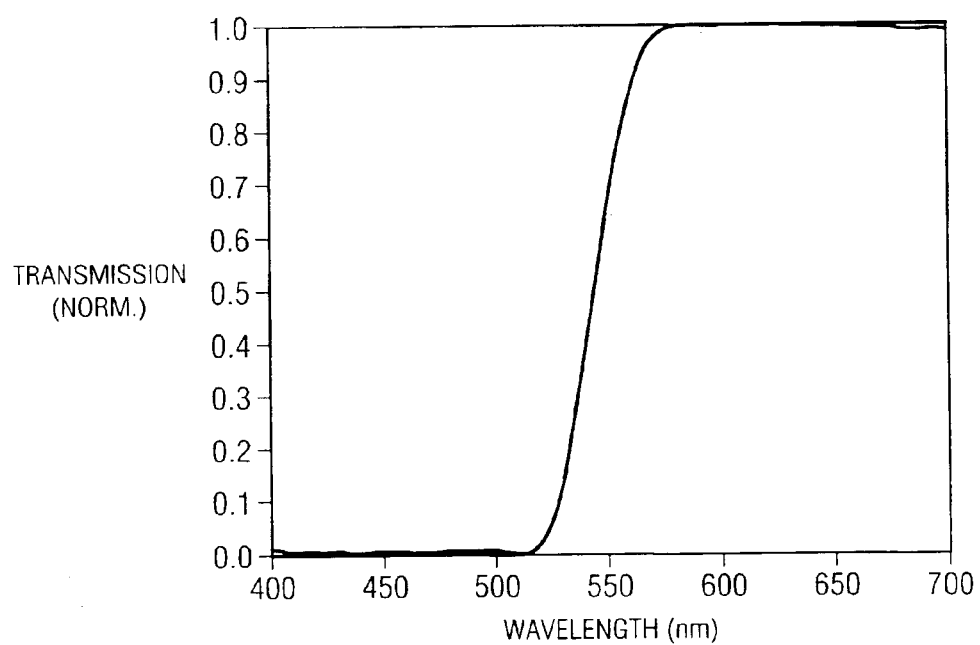
FIG. 10 shows the spectrum of a rotation tolerant Red/Blue filter with the addition of a half-wave plate between paired polarization beam splitters with orthogonal faces where outputs are uniformly averaged over illumination half-cone angles of 0°, 5°, 10°, 15° and 20°, with the latter giving the highest side-lobe leakage.

FIG. 10 shows the spectra of such a skew ray tolerant filter comprising a rotationally invariant Red/Blue CCSPF with a 0-oriented zero-order half-wave retarder between paired PBSs with orthogonal faces. The output represents the uniform weighted azimuth-averaged spectrum for half-cone angles of 0°, 5°, 10°, 15° and 20°. The performance of this filter is greatly improved as shown by the absence of the side lobes in comparison to that of FIG. 2.

FIGS. 11 and 12 show skew ray corrected structures 100. FIG. 11 is substantially the same as FIG. 12 except that a first PBS 102 has an orthogonal orientation as compared to the first PBS 102 of FIG. 12 and output light beam having a first spectrum 104 and the output light beam having a second spectrum 106 have transposed exit points from the second PBS 108. FIG. 12 shows a skew-ray corrected structure, including a purely rotative CCSPF 110 between PBSs with parallel faces. Light 112 is input into a first PBS 102 and transmitted to the purely rotative CCSPF 110 that rotates the polarization orientation of a first part of the input light. The second PBS 108 then separates the input light into the first output light beam 104 and the second output light beam 106 according to its polarization. The input light that was not rotated being transmitted through the second PBS 108.

FIG. 11 shows a skew-ray corrected structure, including a half-wave retarder CCSPF 114 with wavelength selective optic axis orientation between PBSs with crossed faces. Light is input into a first PBS 102 that is rotated as compared to the first PBS 102 of FIG. 12. The light is then transmitted to a CCSPF 114 that acts as a half-wave retarder. The CCSPF 114 reflects the SOP of the received light. The second PBS 108 separates the light received from the CCSPF 114 into a first output light beam 104 and the second output light beam 106 based on the polarization of the light.

Figure 14:
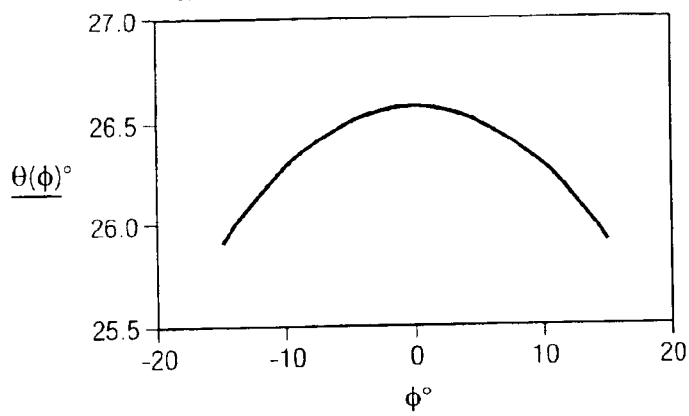
FIG. 14 shows a graph of θ as a function of φ.

FIG. 14 shows a graph of optical axis angle θ verse skew ray angle formed with the x-axis φ. As is shown, there is only a 0.5° variation for θ (φ) which means θ is nearly independent of φ.

Figure 15:
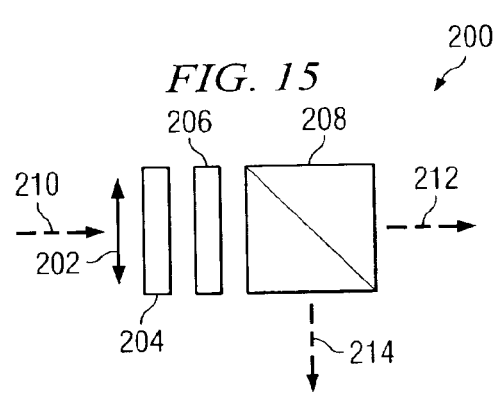
FIG. 15 shows an out-of-plane uniaxial stack used to compensate for skew ray depolarization between a sheet polarizer and a PBS.

FIG. 15 shows the spectra of a Green/Magenta rotationally tolerant filter between paired polarization beam splitters plotted for half cone angles of 0°, 5°, 10°, 15° and 20°. The performance of this filter is much improved as compared to that of FIG. 3 as shown by the absence of the side lobes.

The compensation scheme is modified when the CSPF is situated between polarizers with different symmetry properties. This occurs, for example when compensating for skew-ray depolarization in a CSPF that is sandwiched between a sheet polarizer and a PBS. If a PBS follows a CSPF preceded by a sheet polarizer, an out-of-plane compensator according to the present invention transforms the polarizations into the coordinates of the PBS.

Thus, a plane polarizer does not share the same symmetry as a PBS. The normally incident rays have the same input polarization axes as that of the skew rays, whereas the output polarization is analyzed with the axes rotated for the skew rays and not those normally incident. The skew and normal ray polarizations are acted upon differently.

This embodiment of the invention uses incident angle dependent polarization manipulation so that the skew rays see a different Jones' Matrix to those normally incident. This generally can be achieved by introducing birefringent elements that have axes with a component along the system optic axis, e.g. out of the plane of the film, such that the manipulation has comparable symmetry as that of a PBS.

Additionally, to achieve the odd type symmetry of the PBS in which the axes rotate opposite for rays above and below the system optic axes, the optic axis (or axes) should be in the plane (e.g., the x,y plane) defined by the system optic axis (e.g., the x axis) and the normal to the PBS reflecting plane (e.g., the line x−y=constant). Thus, a birefringent element or stack acts as a half-wave reflector to skew rays only and the reflection angle is proportional to the skew ray incident angle having the correct proportionality constant. One such exemplary embodiment is a single uniaxial birefringent stack with its retardance substantially constant or only varying by a relative small amount over small changes in angle. Thus, the half wave reflection property can be maintained over significant rotation of the skew ray incident angle.

From the second method, one can determine a uniaxial birefringent material whose optic axis n is at an angle θ from the y axis in the x,y plane as follows:

$$n = \begin{pmatrix} \sin(\theta) \\ \cos(\theta) \\ 0 \end{pmatrix}$$

The propagation vector k for a skew ray propagating in the x,z plane with angle $\phi$ from the x axis is:

$$k = \begin{pmatrix} \cos(\phi) \\ 0 \\ \sin(\phi) \end{pmatrix}$$

The uniaxial optic axis as seen by the skew ray in the z,y plane can be determined from the vector cross product $$\frac{n \times k}{|n \times k|}$$

and the result projected onto the two dimensional y,z plane to give:

$$\begin{pmatrix} -\cos(\phi) \cdot \cos(\theta) \\ \sin(\phi) \cdot \sin(\theta) \end{pmatrix}$$

This optic axis makes an angle with the y axis of:

$$= a\cos\left[\frac{(1\ 0) \cdot \begin{pmatrix} -\cos(\phi) \cdot \cos(\theta) \\ \sin(\phi) \cdot \sin(\theta) \end{pmatrix}}{\left|\begin{pmatrix} -\cos(\phi) \cdot \cos(\theta) \\ \sin(\phi) \cdot \sin(\theta) \end{pmatrix}\right|}\right]$$

If the retardance is a half wave then the polarization of the skew-ray is reflected about this axis, forming an angle of $2\rho$ with respect to the y axis. To mimic a PBS, $2\rho=\phi$ resulting in the expression $$\cos\left(\frac{\phi}{2}\right) = \frac{(1\ 0) \cdot \begin{pmatrix} -\cos(\phi) \cdot \cos(\theta) \\ \sin(\phi) \cdot \sin(\theta) \end{pmatrix}}{\left|\begin{pmatrix} -\cos(\phi) \cdot \cos(\theta) \\ \sin(\phi) \cdot \sin(\theta) \end{pmatrix}\right|}$$

This expression can be expanded for the small angles typical of projection systems (e.g., $\phi<15°$ in the PBS). As FIG. 14 shows, the optic axis angle $\theta$ is nearly independent of the input ray propagation angle $\phi$. Thus, a uniaxial material with its optic axis at about 26.25° (±0.25°) to improve CSPF performance by compensating for depolarization. One stack design can be generally used in a projection system to compensate any number of filters between PBSs since the compensator has the added advantage of being broad band.

The stack retardance should be nearly a half-wave over the entire applicable spectrum of light. For visible light, a suitable design wavelength $\lambda_0$ would be 500 nm. However, this may be changed depending on the projection system in which the stack is to be installed. The extraordinary, ne, and ordinary, no, refractive indices and thickness, d, should be selected to adhere closely to the following equation $$\left(\frac{ne \cdot no}{\sqrt{no^2 \cdot \cos(\theta)^2 + ne^2 \cdot \sin(\theta)^2}} - no\right) \cdot d = \frac{\lambda_0}{2}$$

with $\theta$ being between about 26.0° to 26.5°. To make the out-of-plane compensator more achromatic, a further even number of standard in-plane uniaxial or biaxial half wave films can be made with compound retarder designs that assume the out-of-plane retarder acts as a simple in-plane half-waveplate. For any particular design, further optimization can be carried out by altering the out-of-plane orientations of the additional films to optimize the system performance.

Alternatively, the invention provides for correction of skew ray polarization axes between elements that are neither orthogonal nor parallel but at an intermediate angle. This is achieved by reducing the out-of-plane angle from 26.25°, such that near parallel planes can be made, so as to avoid mixing polarizations. The exact angle is determined according to the geometry of the system and the above equations. Additionally, correction of skew ray polarization axes between elements that are neither orthogonal nor parallel but at an intermediate angle could be implemented in conjunction with dichroic beam splitters cause depolarization through skew ray effects.

FIG. 15 is an exemplary embodiment for compensating structures that do not intrinsically posses symmetry, where an out-of-plane uniaxial stack is used to compensate for skew ray depolarization. The sub-system 200 includes a polarizer 202 such as a sheet polarizer, a CSPF 204, an out-of-plane compensator 206 and a PBS 208. Incident light 210 is polarized by the polarizer 202 and then is selectively rotated by the CCSPF 204. Light from the CCSPF 204 then passes through the out-of-plane compensator 206 to compensate for skew ray depolarization before entering the PBS 208. Light from the out-of-plane compensator 206 goes into the PBS 208 which separates it into a first output light beam 212 and a second output light beam 214.

Figure 16:
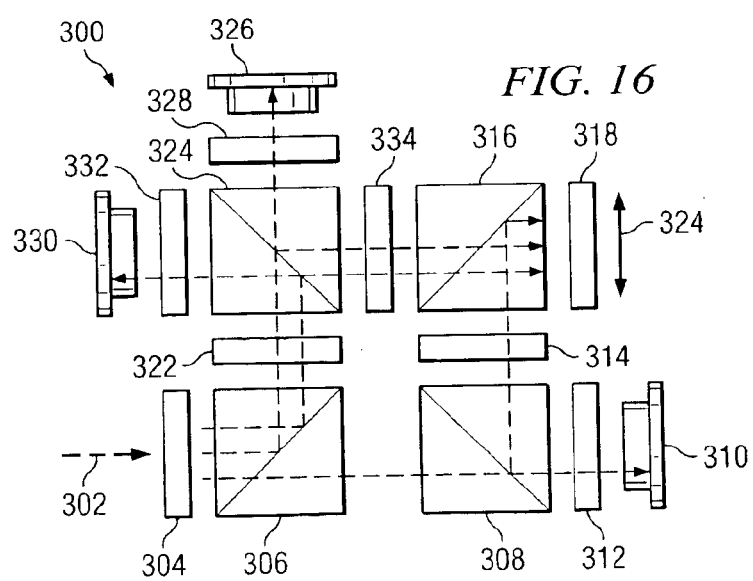
FIG. 16 shows a COLORQUAD™ color management system using CCSPFs and polarizing beamsplitters.

FIG. 16 shows a low f-number COLORQUAD™ color management system 300. In the system 300, s-polarized white light 302 is incident on a first CSPF 304 that converts light of a first spectrum to the orthogonal polarization, that is subsequently transmitted through the first PBS 306. Light that is complementary to the first spectrum remains s-polarized and is subsequently reflected by the first PBS 306. Light having the first spectrum is then transmitted by a second PBS 308 and is subsequently incident upon a first reflective panel 310, which includes a quarter wave plate 312. In the ON-state, light reflected from the first reflective panel 310 is converted from p to s polarization, thereby enabling the second PBS 308 to reflect the light through a first 0-oriented half wave plate 314. Skew-ray corrected light is then reflected by a third PBS 316. The third PBS 316 reflects the first spectrum into a second CSPF 318, which converts light of the first spectrum to p-polarization, after which it is analyzed by a clean-up polarizer 320.

Incident light 302 of a second and third spectrum is reflected by the first PBS 306 onto a first CCSPF 322, which reflects the SOP of the second spectrum about a ±π/4 axis. Light of the second spectrum is transmitted through a fourth PBS 324 to a second reflective panel 326, which includes a quarter wave plate 328. The first CCSPF 322 reflects the SOP of the third spectrum about 0, and it is subsequently reflected by the fourth PBS 324 to a third reflective panel 330, which includes a quarter wave plate 332. ON-state light reflected from the second and third reflective panels 326, 330 returns to the PBS with the orthogonal state, so that light in the second and third spectra is incident on a second CCSPF 334. The second CCSPF 334 reflects the SOP of the second spectrum about a ±π/4 axis and reflects the SOP of the third spectrum about 0, thus restoring both spectra to p-polarization. Skew ray corrected p-polarized light is then transmitted by the third PBS 316, the second CSPF 318 and the clean-up polarizer 320. Situated between each panel and PBS is a quarter-wave plate oriented to correct for skew rays.

In practice, CSPF filters 304 and 318 are green/magenta retarder stacks with offset 50% spectral transition points. Notches can be introduced via absorption of true yellow and true cyan light that exists between the transitions of the CSPFs. This true yellow and true cyan light is substantially absorbed by the clean-up polarizer 320, producing an enhanced color gamut and increased contrast.

By eliminating green light from the spectrum reflected by the first PBS, 306, the transition between the second and third spectra can be relaxed (50% point in the green), with no consequence on system performance. This simplifies the stack design for the CCSPFs 322, 334. In the event that zero-order half-wave plates are used in combination with CSPFs that act as pure rotators to form the CCSPF, the center wavelength can be different for each filter. If the center wavelengths are offset to improve performance, preference may be given to centering the half-wave retardance in the third spectral band for the first CCSPF 322 and for centering the half-wave retardance in the second spectral band for the second CCSPF 334.

Figure 17:
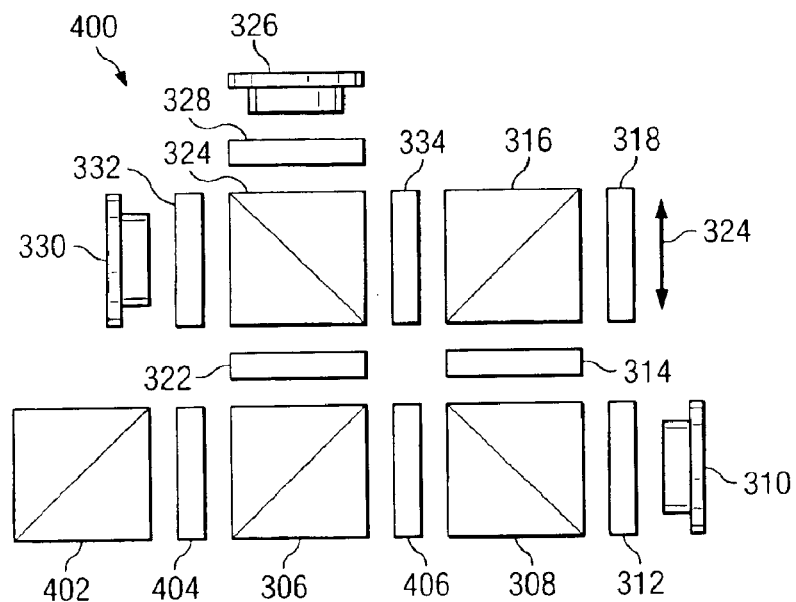
FIG. 17 shows another exemplary COLORQUAD™ color management system using CCSPFs.

FIG. 17 shows another color projection system 400 which is similar to the system 300 of FIG. 16 but uses a pre-polarizing PBS 402 in combination with an input CCSPF 404 to provide an illumination path that is skew ray compensated. The CCSPF 404 functions as a pure 90° rotator in one portion of the spectrum and is isotropic in another portion of the spectrum. The pre-polarizing PBS 402 is advantageous due to its tolerance to high intensity illumination often seen at the light input point (e.g., near or at the light source) of color projection systems. An additional half-wave plate 406 is also incorporated to provide skew ray correction for light of the first spectrum in the illumination arm. An additional out-of-plane compensator (not shown) placed between the third PBS 816 and the clean up polarizer 324 can be used to compensate for skew-ray mismatch between those elements without significantly increasing the back focal length of the projection lens.

Figure 18:
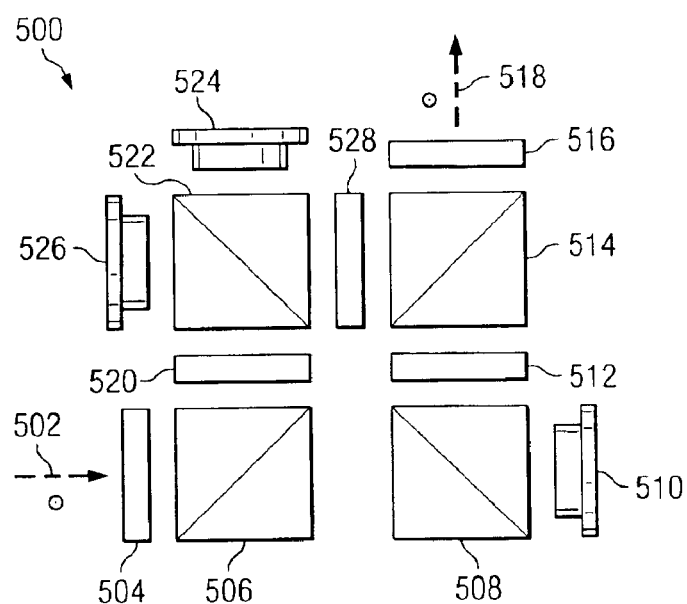
FIG. 18 shows a 90° COLORQUAD™ color management system using CCSPFs and PBSs.

FIG. 18 shows a low f-number 90° COLORQUAD™ color management system 500. In the system 500, s-polarized white light 502 is incident on a first CSPF 504 that converts light of a first spectrum to the orthogonal polarization, that is subsequently transmitted through the first PBS 506. Light that is complementary to the first spectrum remains s-polarized and is subsequently reflected by the first PBS 506. Light having the first spectrum is then transmitted by a second PBS 508 and is subsequently incident upon a first reflective panel 510. In the ON-state, light reflected from the first reflective panel 510 is converted from p to s polarization, thereby enabling the second PBS 508 to reflect the light through a first π/4-oriented half wave plate 512. Skew-ray corrected light is then transmitted by a third PBS 514. The third PBS 514 transmits the first spectrum into a second CSPF 516, which converts light of the first spectrum to s-polarization light 518, after which the s-polarized light 518 is analyzed by a clean-up polarizer (e.g., an s-polarizer) (not shown). Quarter wave plates (not shown) can be inserted between each panel and the PBS. Also, the compensation methods shown in FIG. 17 can be used to improve the system performance.

Incident light 502 of a second and third spectrum is reflected by the first PBS 506 onto a first CCSPF 520, which reflects the SOP of the second spectrum about a ±π/4 axis. Light of the second spectrum is transmitted through a fourth PBS 522 to a second reflective panel 524. The first CCSPF 520 reflects the SOP of the third spectrum about 0, and it is subsequently reflected by the fourth PBS 522 to a third reflective panel 526. ON-state light reflected from the second and third reflective panels 524, 526 returns to the PBS 522 with the orthogonal state, so that light in the second and third spectra is incident on a second CCSPF 528. The second CCSPF 528 reflects the SOP of the third spectrum about a ±π/4 axis and reflects the SOP of the second spectrum about 0, thus restoring both spectra to s-polarization. Skew ray corrected s-polarized light is then reflected by the third PBS 514, the second CSPF 516 and the clean up polarizer (not shown). Situated between each panel and PBS is a quarter-wave plate oriented to correct for skew rays. Again, the compensation methods such as shown in FIG. 17 can be used to improve system performance.

Using a green-magenta CSPF for the first CSPF 504, light in the second and third spectra represents blue and red (or vice versa). Because most UHP lamps are green rich and red deficient, the 90° quad accomplishes an attractive color balance function. In order for green ON-state light to exit the system, it is transmitted through a PBS three times and is reflected by a PBS only once. Conversely, magenta light in the ON-state is reflected from a PBS three times and transmitted through a PBS once. Due to the relatively high efficiency of a PBS reflection, the magenta light exits the system with higher throughput than green light, thus color balancing the system.

Figure 19:
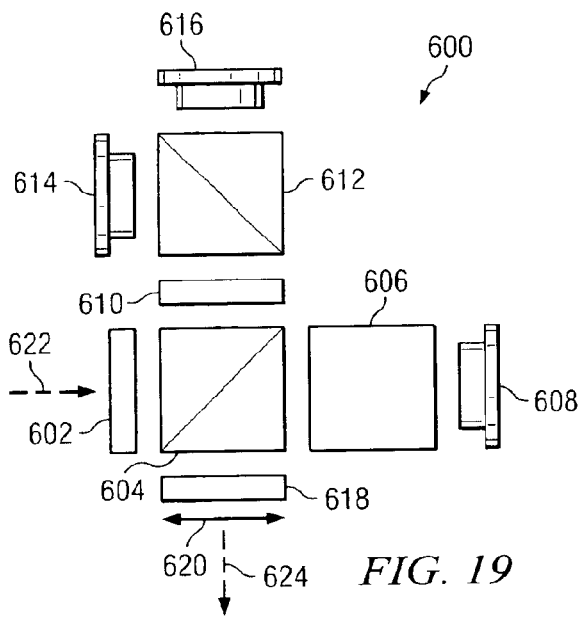
FIG. 19 shows a three-panel color projection system including skew-ray depolarization compensation.

FIG. 19 shows another three panel color management system 600 according to another exemplary embodiment the present invention. The system 600 includes a first CSPF of a first rotation spectrum 602, a PBS 604, a spacer cube 606, a first reflective color panel 608, a compensation element 610 such as a half-wave retarder, a dichroic beam splitter 612, a second reflective color panel 614, a third reflective panel 616, a second CSPF 618 and an output p-polarizer 620. The system 600 receives an input light 622 at the first CSPF 602 and outputs output light 624 at output p-polarizer 620. The dichroic reflecting surface of the dichroic beam splitter 612 is orthogonal to that of the PBS 604. The orthogonal relationship places the second reflective panel 614 on the side opposite the cube 606 and avoids mechanical interference between the second reflective panel 614 and the cube 606, simplifying assembly. The orthogonal reflecting surfaces are skew ray compensated by the compensation element 610, that is sufficiently achromatic. Additional compensation methods, such as illustrated in FIG. 17, can be used to improve system performance.

Figure 20:
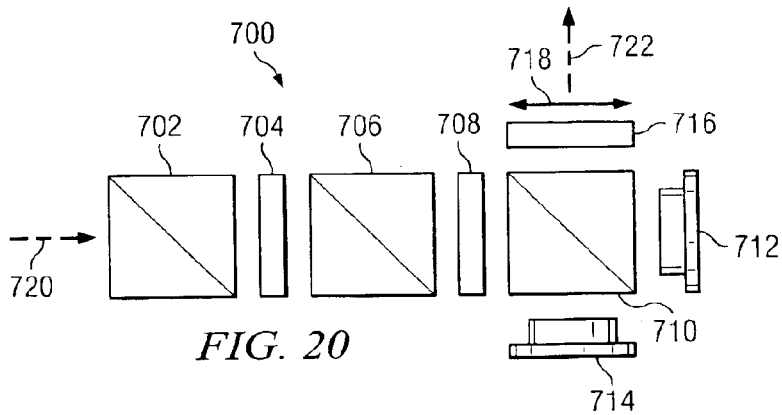
FIG. 20 shows a two-panel exemplary color projection system including skew ray depolarization compensation.

FIG. 20 shows a 2-panel exemplary color projection system 700 including skew ray depolarization compensation. This two panel embodiment is further described in patent application Ser. No. 09/779,443 which is incorporated herein by reference. The system 700 of FIG. 20 includes a first polarizing PBS 702, a blue/green ColorSwitch™ 704, a second PBS 706, a rotation tolerant cyan/red CCSPF 708, a third PBS 710, a red reflective panel 712, a blue/green reflective panel 714, a red/cyan CSPF 716 and an output p polarizer 718. Input light 720 is input into the system 700 at the first polarizing PBS 702. Light from the first polarizing PBS 702 is then incident upon the blue/green ColorSwitch™ 704. The blue/green ColorSwitch™ 704 alters the SOP of the light such that the second PBS 706 determine whether blue or green will be transmitted through the second PBS 706. A passive portion of the color switch converts red light to an orthogonal polarization, but the active portion of the color switch has no effect on the SOP of red light. The rotation tolerant cyan/red CCSPF 708 then receives the light from the second PBS 706 and changes the SOP of the blue/green light so that the third PBS 710 will direct the blue and green light to the blue/green reflective panel 714 and will direct the red light to the red reflective panel 712. After reflection from the panels 712, 714, red light is reflected by the third PBS 710 and blue/green light is transmitted by the third PBS 710 to the red/cyan CSPF 716 and the output p polarizer 718 to form an output light beam 722. An out-of-plane compensated CCSPF can be used to provide additional skew-ray compensation between the third PBS 710 and the output p polarizer 718.

Figure 21:
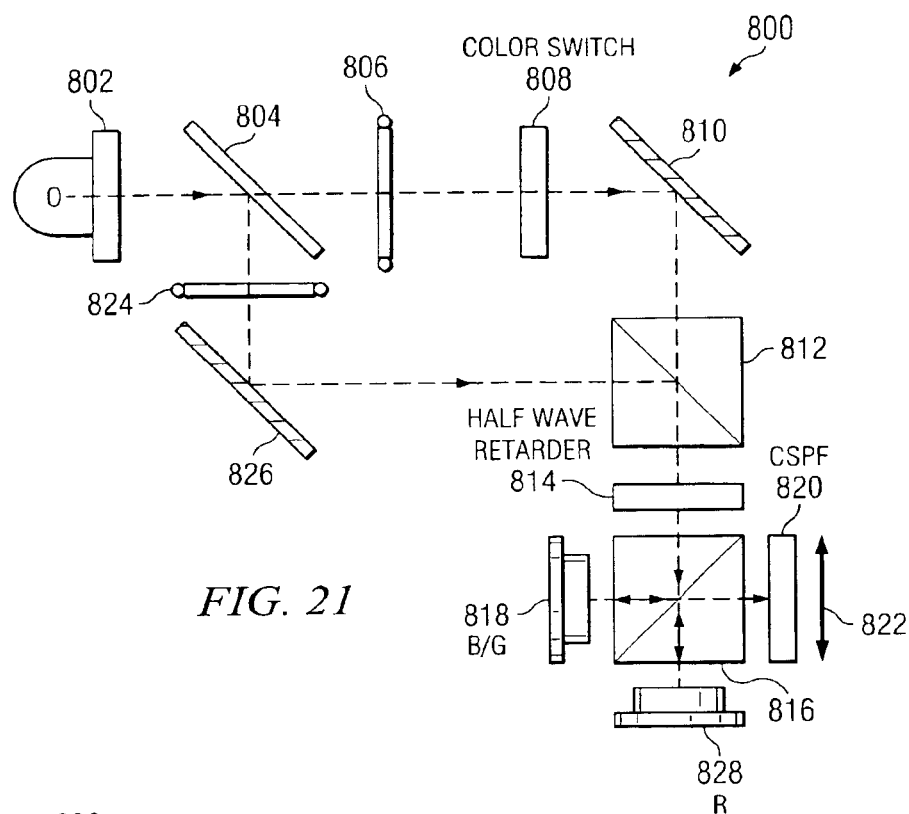
FIG. 21 shows another two-panel exemplary color projection system including skew ray depolarization compensation.

FIG. 21 shows a 2-panel exemplary color projection system 800 including skew ray depolarization compensation. White light from a light source 802, which may be polarized, is incident on a dichroic mirror 804, such that blue and green are transmitted to an s-polarizer 806. The SOP of blue and green are actively controlled using color switch 808. The output is reflected by fold-mirror 810, and the polarization is subsequently analyzed by a PBS 812, such that the transmission of blue and green are temporally modulated onto an achromatic π/4-oriented half-wave retarder 814. Blue and green skew-ray corrected light converted to s-polarization by the half-wave retarder 814 is then reflected by a PBS 816, with ON-state light converted to p-polarization by a blue/green reflective panel 818. ON-state light transmitted by the PBS 816 is transmitted by red/cyan (R/C) CSPF 820 with no change in SOP, and the polarization is subsequently analyzed by a clean-up polarizer 822. Out-of-plane compensators (not shown) can be inserted between the sheet polarizers and PBSs to improve system performance.

Red light reflected by the dichroic mirror 804 is polarized by an s-polarizer 824 then reflected by a fold mirror 826 and reflected by a PBS 812. The half-wave retarder 814 converts red light to p-polarization, which is then transmitted through the PBS 816 to a red reflective panel 828. Light reflected from the red reflective panel 828 is the PBS 816 and is converted to p-polarization by the R/C CSPF 820. This p-polarized light is then analyzed by the clean-up polarizer 822. Again, additional compensation methods, such as is illustrated in FIG. 17, can be used to improve the performance of this system.

Figure 22:
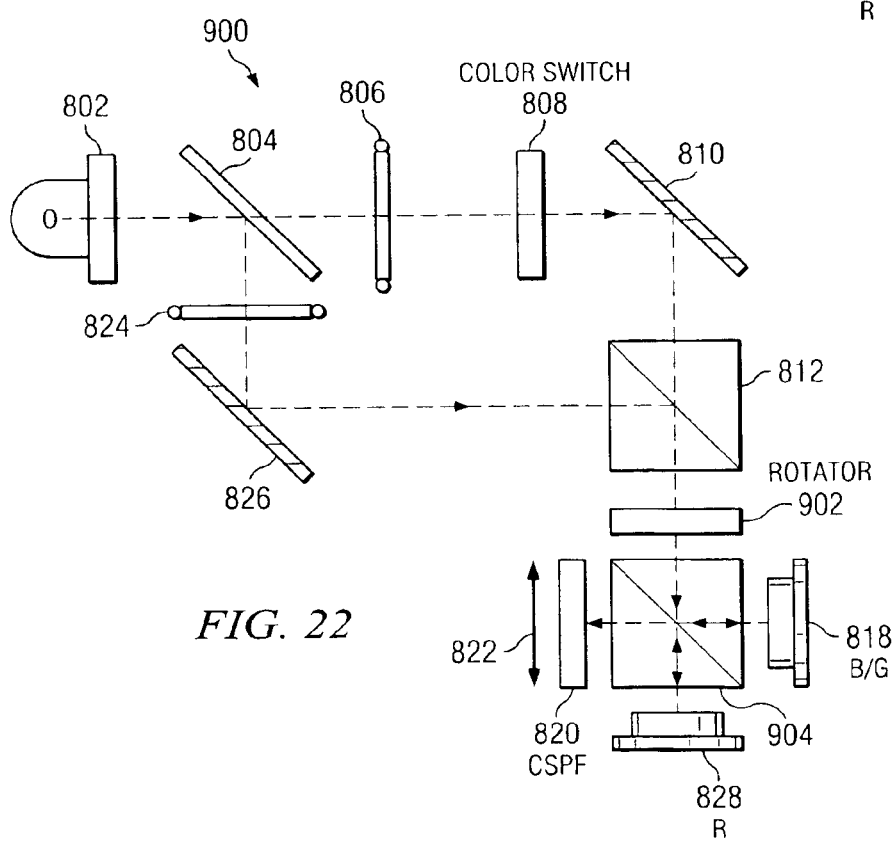

FIG. 22 shows a 2-panel exemplary color projection system 900 including skew ray depolarization compensation. FIG. 22 is similar to FIG. 21 except the half-wave retarder 814 has been replaced with an achromatic 90° rotator having no retardation 902 and the PBS 816 has been replaced with an orthogonal PBS 904. The achromatic rotator 902 rotates the polarization of the light passing through it whereas the half-wave retarder 814 provides reflection about an axis. The rotation instead of reflection of the light makes the orientation of the PBSs 812, 904 parallel instead of orthogonal and reverses the positions of the blue/green reflective panel 818 with that of the C/R CSPF 820 and the clean-up polarizer 822. The achromatic pure-rotator may be a simpler structure to manufacture and is less sensitive to orientation in the system. For example, a stack formed of polycarbonate films with 250 nm retardation and angles 90°, −18.7°, 3.9°, −37.6°, 31.5°, and 47.7°, efficiently rotates all visible light, nearly independent of its orientation with the input polarization.

Figure 23:
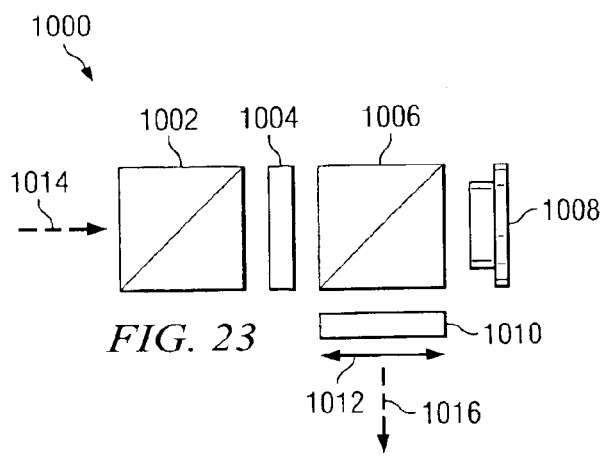
FIG. 23 shows a single-panel projection system including skew-ray depolarization compensation.

FIG. 23 shows a 1-panel exemplary color projection system including skew ray depolarization compensation. This single panel embodiment without skew ray depolarization compensation is further described in patent application Ser. No. 09/126,330 which is incorporated herein by reference. The system 1000 of FIG. 23 includes a first polarizing PBS 1002, a red/green/blue ColorSwitch™ 1004, a second PBS 1006, a reflective panel 1008, an achromatic out-of-plane compensator 1010, and an output s-polarizer 1012. Input light 1014 is input into the system 1000 and polarized by the first polarizing PBS 1002 and transmitted to the ColorSwitch™ 1004. The light from the ColorSwitch™ 1004 travels through the second PBS 1006 and is incident upon the reflective panel 1008. The reflective panel 1008 reflects light back to the second PBS 1006, which reflects the light through the compensator 1010 and the output s-polarizer 1012. The light transmitted through the output s-polarizer 1012 is the output light 1016.

The above compensation techniques can compensate skew ray depolarization in most CSPF/PBS architectures and are not limited to color projection systems. This applies equally well to all kinds of beam splitters including but not limited to PBSs, dichroic beam splitters, partially transmissive mirrored surfaces such as a partially silvered mirror beam splitter, and the like. Additionally, these techniques can also be used in any system in which light passes through a series of reflective surfaces at angles other than normal to the propagation direction to maintain polarization integrity.

The compensating stacks described herein may be made from any suitable material such as solid crystals, stretched polymers, liquid crystal polymers, or another material. The liquid crystal polymer can have dual homogeneous alignment, splay alignment (homogeneous/homeotropic) or any suitable alignment. Although the compensated retarder stacks are discussed in the context of color management for projection display, they can be used in a number of applications. These include, among others, color separation for image capture or radiometry, lighting, and near infrared optical communications.

Although the exemplary embodiments described herein may be described in reference to specific colors or combinations of colors, it should be understood that other color combinations are also possible. For example, the color filters can be any combination of colors including Red/Blue, Blue/Green, Red/Green, an additive primary and its complementary subtractive primary or any other color pair as system criteria dictate.

As used herein, rotation is not limited to a pure optical rotation but also includes any transformation that results in optical rotation or other effects that result in optical rotation. For example, a half wave plate at 45E can transform a linear state into an orthogonal linear state via retardation.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims

We claim:

1. An optical filter comprising:

at least three retarders, wherein the at least three retarders act as a half wave plate to light of a first spectrum; and wherein the at least three retarders act as a half wave plate with a $\pi/4$ displaced optical axis to light of a second spectrum.

2. The optical filter of claim 1, wherein the at least three retarders act as a half wave plate with an orientation of 0° in the first spectrum and 45° in the second spectrum.

3. The filter of claim 1, wherein the at least three retarders have wavelength stable half wave retardation and wavelength stable eigenpolarization in at least one of the first spectrum and the second spectrum.

4. The filter of claim 1, wherein the at least three retarders are achromatic in the first spectrum and the second spectrum.

5. The filter of claim 1, further comprising a first beam splitter in optical series with the at least three retarders.

6. The filter of claim 5, wherein the first beam splitter is a polarizing beam splitter.

7. The filter of claim 5, wherein the first beam splitter is a dichroic beam splitter.

8. The filter of claim 5, wherein the first beam splitter is a partially metallized mirror beam splitter.

9. The filter of claim 5, further comprising a second beam splitter in optical series with the at least three retarders and the first beam splitter.

10. The filter of claim 9, wherein the first beam splitter and the second beam splitter have mutually orthogonal normal vectors.

11. The filter of claim 1, further comprising:

a first beam splitter and a second beam splitter, wherein the at least three retarders are between the first beam splitter and the second beam splitter; and wherein skew light ray polarization effects of the first beam splitter are offset by skew light ray polarization effects of the at least three retarders and second beam splitter.

12. The filter of claim 1, further comprising a color projection system.

13. The filter of claim 1, wherein the at least three retarders are an out-of-plane uniaxial compensator.

14. The filter of claim 13, wherein the at least three retarders have an optical axis θ between about 26.0° to 26.5°.

15. The filter of claim 1, wherein the at least three retarders have a substantially wavelength stable eigenpolarization along a direction of a design axis of the at least three retarders.

16. An optical filter method, the steps of the method comprising:

retarding light of a first spectrum; and retarding light of a second spectrum;

wherein a half wave of retardation is provided by the retarding light of the first spectrum; and wherein a retardation equivalent to a half wave plate with a $\pi/4$ displaced optical axis is provided by the retarding light of the second spectrum.

17. The method of claim 16, wherein the retarding light of the first spectrum and the retarding light of the second spectrum are achromatic.

18. The method of claim 16, further comprising separating light into two different paths.

19. The method of claim 18, wherein the separating is according to polarization.

20. The method of claim 18, wherein the separating is according to light wavelength.

21. The method of claim 16, further comprising:

a first separating of light into a first path and a second path;

a second separating of light into a third path and a fourth path;

wherein the optical retardation occurs after the first separating but before the second separating such that skew light ray polarization effects of the first separating are compensated by the optical retardation so as to match skew light ray polarization effects of the second separating.

22. The filter of claim 21, wherein the first path and the third path are parallel; and the second path and fourth path are antiparallel.

23. The method of claim 16, wherein the retarding light of the first spectrum and the retarding light of the second spectrum have substantially wavelength stable eigenpolarizations.

* * * * *